United States Patent
Wang et al.

(10) Patent No.: US 11,967,125 B2
(45) Date of Patent: Apr. 23, 2024

(54) IMAGE PROCESSING METHOD AND SYSTEM

(71) Applicant: CONTEMPORARY AMPEREX TECHNOLOGY CO., LIMITED, Ningde (CN)

(72) Inventors: Zhiyu Wang, Ningde (CN); Lu Li, Ningde (CN); Jin Wei, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 18/295,513

(22) Filed: Apr. 4, 2023

(65) Prior Publication Data
US 2023/0237763 A1    Jul. 27, 2023

Related U.S. Application Data

(63) Continuation of application No. PCT/CN2021/136052, filed on Dec. 7, 2021.

(51) Int. Cl.
*G06T 7/00* (2017.01)
*G06T 7/10* (2017.01)
(Continued)

(52) U.S. Cl.
CPC ............. *G06V 10/44* (2022.01); *G06T 7/10* (2017.01); *G06V 10/764* (2022.01); *G06T 2207/20084* (2013.01)

(58) Field of Classification Search
CPC ........ G06N 20/00; G06N 3/08; G06N 3/0454; G06N 3/02; G06N 3/0472; G06N 7/005;
(Continued)

(56) References Cited

U.S. PATENT DOCUMENTS

| | | | | |
|---|---|---|---|---|
| 2013/0084007 | A1* | 4/2013 | Salamati | G06T 7/162 382/173 |
| 2015/0063684 | A1* | 3/2015 | Taylor | G06T 7/536 382/154 |

(Continued)

FOREIGN PATENT DOCUMENTS

| | | | |
|---|---|---|---|
| CN | 110648334 A | | 1/2020 |
| CN | 111080615 A | * | 4/2020 |

(Continued)

OTHER PUBLICATIONS

International Search Report for PCT Application No. PCT/2021/136052, dated Sep. 6, 2022.
(Continued)

*Primary Examiner* — Quan M Hua
(74) *Attorney, Agent, or Firm* — Ladas & Parry LLP

(57) ABSTRACT

The present application relates to an image processing method and system. The method includes: determining an enhanced image of a target object of an input image based on a segmentation algorithm, where the enhanced image of the target object comprises an image in which each pixel classified as the target object is displayed in an enhanced manner; and determining a positioning image of the target object by applying an integral image algorithm to the enhanced image of the target object.

10 Claims, 7 Drawing Sheets

Determine an enhanced image of a target object of an input image based on a segmentation algorithm — 105

Determine a positioning image of the target object by applying an integral image algorithm to the enhanced image of the target object — 110

(51) Int. Cl.
*G06V 10/44* (2022.01)
*G06V 10/764* (2022.01)

(58) Field of Classification Search
CPC .......... G06N 3/088; G06N 3/006; G06N 5/02; G06N 3/126; G06N 20/20; G06T 2207/20081; G06T 2207/20084; G06T 7/0002; G06T 7/0014; G06T 7/20; G06T 2207/30168; G06T 2207/20076; G06T 15/205; G06T 2207/10012; G06K 9/4628; G06K 2209/05; G06K 9/00369; G06K 9/46; G06K 9/6262; G06K 9/00147; G06K 9/00302; G06K 9/0063; G06K 9/325; G16H 30/40; G06F 16/55
See application file for complete search history.

(56) References Cited

U.S. PATENT DOCUMENTS

| | | | |
|---|---|---|---|
| 2019/0130229 A1 | 5/2019 | Lu et al. | |
| 2019/0244346 A1 | 8/2019 | Schafer | |
| 2020/0082535 A1* | 3/2020 | Lindskog | G06V 40/161 |
| 2021/0056694 A1 | 2/2021 | Schafer | |
| 2021/0295108 A1 | 9/2021 | Bar | |
| 2022/0292684 A1* | 9/2022 | Wang | G06N 3/084 |

FOREIGN PATENT DOCUMENTS

| | | | | | |
|---|---|---|---|---|---|
| CN | 111445493 | A | | 7/2020 | |
| CN | 112508939 | A * | 3/2021 | ........... G06N 3/0454 |
| CN | 112508939 | A | | 3/2021 | |
| CN | 113065467 | A | | 7/2021 | |
| WO | WO-2020215058 | A1 * | 10/2020 | ........ G01N 21/6428 |

OTHER PUBLICATIONS

Written Opinion for PCT Application No. PCT/2021/136052, dated Sep. 6, 2022.
Extended European Search Report for EP Application No. 21960095.4, dated Nov. 22, 2023.

* cited by examiner a                                          b c

IMAGE PROCESSING METHOD AND SYSTEM

CROSS REFERENCE TO RELATED APPLICATION

This application is a continuation of International Patent Application No. PCT/CN2021/136052, filed on Dec. 7, 2021, the disclosure of which is incorporated by reference in its entirety.

TECHNICAL FIELD

The present application relates to computer technologies, and in particular, to image processing technologies.

BACKGROUND

Image processing with computers is widely used in various fields. Image processing can be used to improve the visual quality of images, extract features of specific objects in images, store and transmit images, and the like. To extract a feature of a specific object in an image, it is desirable to identify and position the specific object.

Therefore, an improved technology that can accurately position a specific object in an image is required.

SUMMARY

In view of the above problems, the present application provides an image processing method and system that can improve the accuracy of positioning and segmenting a specific target in an image.

According to a first aspect, the present application provides an image processing method, including: determining an enhanced image of a target object of an input image based on a segmentation algorithm, where the enhanced image of the target object includes an image in which each pixel classified as the target object is displayed in an enhanced manner; and determining a positioning image of the target object by applying an integral image algorithm to the enhanced image of the target object.

In the technical solution of this embodiment of the present application, whether each pixel in the image belongs to the target object or belongs to the non-target object is classified based on the segmentation algorithm, and on this basis, the target object is positioned in the input image. The segmentation and positioning of the target object are combined and the segmentation algorithm and the integral image algorithm are combined, so that the positioning accuracy of the target object can be improved.

In some embodiments, the determining an enhanced image of a target object of an input image based on a segmentation algorithm further includes: performing feature extraction on the input image to determine a pixel feature graph; performing feature extraction on the input image to determine a context feature graph; determining context relation information of each pixel based on the pixel feature graph and the context feature graph; and determining the enhanced image of the target object according to the context relation information and the input image, where a pixel of the enhanced image of the target object includes weight information, and the weight information is related to whether the pixel belongs to the target object. In the present application, not only pixel-level classification information, but also context classification information around a target pixel are considered in the segmentation algorithm, and a final classification result of the target pixel is determined based on the relation between the target pixel and the context thereof. Context information is incorporated into a segmentation algorithm to further improve the classification accuracy of the target pixel, thereby segmenting the target object more accurately. A weight applied to each pixel finally classified as the target object is changed to generate the enhanced image of the target object, so that the target object is displayed in an enhanced manner, thereby providing a more accurate basis for subsequent positioning processing and further improving the positioning accuracy of the target object. The weight may be configured by a user. A change of weight setting can affect the enhancement effect of the target object in the enhanced image of the target object, so that the desired enhancement effect of the target object can be achieved through user setting.

In some embodiments, the determining a positioning image of the target object by applying an integral image algorithm to the enhanced image of the target object further includes: determining an integral image according to the enhanced image of the target object; and determining the positioning image of the target object by using the integral image. The integral image algorithm is applied to the enhanced image of the target object in which the target object is displayed in an enhanced manner, so that the positioning accuracy of the target object can be further improved.

In some embodiments, the determining an integral image according to the enhanced image of the target object further includes: applying a scale factor to the enhanced image of the target object. A volume of data to be processed can be adjusted by applying a scale factor, so that an operation process can be accelerated and/or the accuracy of the integral image can be improved according to actual needs.

In some embodiments, the method further includes: calculating a loss rate between the enhanced image of the target object and the input image based on a loss function; and feeding back the calculated loss rate to the segmentation algorithm. A loss rate between the enhanced image of the target object output by the segmentation algorithm and a labeled production line image reflects the similarity between the enhanced image of the target object output by the segmentation algorithm and the original input image. The loss rate is fed back to the segmentation algorithm to perform supervised learning training on the segmentation algorithm. The accuracy of the segmentation algorithm can be improved through continuous training and learning while fit regression is trained.

In some embodiments, the method further includes: updating the segmentation algorithm based on the loss rate or the labeled production line image or a combination of both. The segmentation algorithm in the present application trains the calculated loss rate or the labeled production line image or a combination of both as training data, and can continuously improve the accuracy of the segmentation algorithm in target object segmentation in a supervised learning manner. In addition, since the training data all comes from the real production line, the training data can cover actual needs and be used and promoted in practice in the production line.

In some embodiments, the segmentation algorithm is implemented by a deep convolutional neural network HRNet18. HRNet18 maintains high-resolution features in the entire segmentation algorithm process and facilitates accurate segmentation of the target object. In addition, different branches of the HRNet18 network produce features of different resolutions, and these features interact to obtain information, so that high-resolution features including multi-channel information can be obtained. In addition, in a case of a limited volume of training data, selection of the HRNet18 model avoids the risk of overfitting and at the same time can accelerate the operation speed of the entire segmentation algorithm because of the small structure of the model.

According to a second aspect, the present application provides an image processing system, including: a segmentation module, configured to determine an enhanced image of a target object of an input image based on a segmentation algorithm, where the enhanced image of the target object includes an image in which each pixel classified as the target object is displayed in an enhanced manner; and a positioning image generation module, configured to determine a positioning image of the target object by applying an integral image algorithm to the enhanced image of the target object.

In the technical solution of this embodiment of the present application, whether each pixel in the image belongs to the target object or belongs to the non-target object is classified based on the segmentation algorithm, and on this basis, the target object is positioned in the input image. The segmentation and positioning of the target object are combined and the segmentation algorithm and the integral image algorithm are combined, so that the positioning accuracy of the target object can be improved.

In some embodiments, the segmentation module further includes: a feature extraction component, configured to perform feature extraction on the input image to determine a pixel feature graph and perform feature extraction on the input image to determine a context feature graph; a context component, configured to determine context relation information of each pixel based on the pixel feature graph and the context feature graph; and an enhanced image generation component, configured to determine the enhanced image of the target object according to the context relation information and the input image, where a pixel of the enhanced image of the target object includes weight information, and the weight information is related to whether the pixel belongs to the target object. In the present application, not only pixel-level classification information, but also context classification information around a target pixel are considered in the segmentation algorithm, and a final classification result of the target pixel is determined based on the relation between the target pixel and the context thereof. Context information is incorporated into a segmentation algorithm to further improve the classification accuracy of the target pixel, thereby segmenting the target object more accurately. A weight applied to each pixel finally classified as the target object is changed to generate the enhanced image of the target object, so that the target object is displayed in an enhanced manner, thereby providing a more accurate basis for subsequent positioning processing and further improving the positioning accuracy of the target object. The weight may be configured by a user. A change of weight setting can affect the enhancement effect of the target object in the enhanced image of the target object, so that the desired enhancement effect of the target object can be achieved through user setting.

In some embodiments, the positioning image generation module is further configured to: determine an integral image according to the enhanced image of the target object; and determine the positioning image of the target object by using the integral image. The integral image algorithm is applied to the enhanced image of the target object in which the target object is displayed in an enhanced manner, so that the positioning accuracy of the target object can be further improved.

In some embodiments, the positioning image generation module is further configured to apply a scale factor to the enhanced image of the target object. A volume of data to be processed can be adjusted by applying a scale factor, so that an operation process can be accelerated and/or the accuracy of the integral image can be improved according to actual needs.

In some embodiments, the system further includes a loss rate module, configured to: calculate a loss rate between the enhanced image of the target object and the input image based on a loss function; and feed back the calculated loss rate to the segmentation module. A loss rate between the enhanced image of the target object output by the segmentation algorithm and a labeled production line image reflects the similarity between the enhanced image of the target object output by the segmentation algorithm and the original input image. The loss rate is fed back to the segmentation algorithm to perform supervised learning training on the segmentation algorithm. The accuracy of the segmentation algorithm can be improved through continuous training and learning while fit regression is trained.

In some embodiments, the segmentation module is further configured to update the segmentation module based on the loss rate or the labeled production line image or a combination of both. The segmentation algorithm in the present application trains the calculated loss rate or the labeled production line image or a combination of both as training data, and can continuously improve the accuracy of the segmentation algorithm in target object segmentation in a supervised learning manner. In addition, since the training data all comes from the real production line, the training data can cover actual needs and be used and promoted in practice in the production line.

According to a third aspect, the present application provides an image processing system, including: a memory storing computer-executable instructions; and a processor coupled to the memory, where the computer-executable instructions, when executed by the processor, cause the system to perform the following operations: determining an enhanced image of a target object of an input image based on a segmentation algorithm, where the enhanced image of the target object includes an image in which each pixel classified as the target object is displayed in an enhanced manner; and determining a positioning image of the target object by applying an integral image algorithm to the enhanced image of the target object.

In the technical solution of this embodiment of the present application, whether each pixel in the image belongs to the target object or belongs to the non-target object is classified based on the segmentation algorithm, and on this basis, the target object is positioned in the input image. The segmentation and positioning of the target object are combined and the segmentation algorithm and the integral image algorithm are combined, so that the positioning accuracy of the target object can be improved.

The aforementioned description is only an overview of the technical solutions of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

Various other advantages and benefits will become apparent to those of ordinary skill in the art upon reading the following detailed description of preferred embodiments. The drawings are merely for the purpose of illustrating the preferred embodiments and are not to be construed as limiting the present application. Moreover, like components are denoted by like reference numerals throughout the drawings. In the drawings.

DETAILED DESCRIPTION

Figure 1:
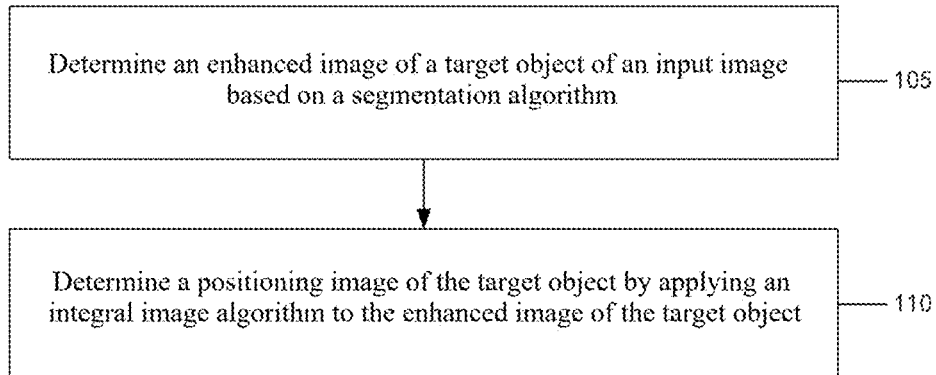
FIG. 1 is a flowchart of an image processing method according to some embodiments of the present application.

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "multiple" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects.

In the description of the embodiments of the present application, the term "multiple" means two or more (including two), similarly the term "multiple groups" means two or more groups (including two groups), and the term "multiple pieces" means two or more pieces (including two pieces).

Image processing with computers is widely used in various fields. Image processing can be used to improve the visual quality of images, extract features of specific objects in images, store and transmit images, and the like. To extract a feature of a specific object in an image, it is desirable to identify and position the specific object. The extraction of the specific object can be used for defect detection of the specific object. For example, for power lithium batteries, images of lithium batteries produced on a production line are captured and target objects such as tabs are positioned, so that it can be effectively detected whether the tabs have defects such as folding.

In a production process of power lithium batteries, defects are inevitable due to process and device reasons. In each procedure of the production line, it is crucial to detect whether tabs of lithium batteries are folded. The validity of a detection result ensures the safety of batteries when batteries are delivered from factories. However, since a tab only occupies a very small percentage of an entire lithium battery, the detection of whether the tab is folded has very high requirements on a resolution of an image and accurate positioning of the tab.

Some image processing methods include: performing double-Gaussian difference on an input image, labeling the processed image, constructing a neural network and a model for training and learning, and finally performing data inference based on the model. In such technologies, the first step is generally inputting image data into the model for feature extraction. Therefore, the quality (for example, a resolution and a signal-to-noise ratio) of the input image data directly affects the accuracy of the trained model. When a target object such as a lithium battery tab is small, the method of double-Gaussian difference cannot effectively position an extremely small target object that requires an extremely high resolution, and image background (a non-target object) has a large interference on the target object. This leads to low accuracy of target object positioning and ultimately leads to the difficulty in accurately detecting defects of the target object (for example, whether the tab is folded). Therefore, an improved technology that can accurately position a target object that occupies a small percentage of an image and requires a high resolution is required.

In view of the above problems, the present application provides a technology that can accurately position a target object that occupies a small percentage of an image and requires a high resolution. The solution of the present application may include segmentation of the target object and positioning of the target object. In a segmentation stage, in the present application, an enhanced image of a target object of an input image is determined based on a segmentation algorithm, where the enhanced image of the target object includes an image in which each pixel classified as the target object is displayed in an enhanced manner; In a positioning stage, in the present application, an integral image is generated according to the enhanced image of the target object, and a positioning image of the target object is generated based on an integral image algorithm.

In the technical solution of this embodiment of the present application, whether each pixel in the image belongs to the target object or belongs to the non-target object is classified based on the segmentation algorithm, and on this basis, the target object is positioned in the input image. The segmentation and positioning of the target object are combined and the segmentation algorithm and the integral image algorithm are combined, so that the positioning accuracy of the target object can be improved.

The technical solutions of the embodiments of the present application are applicable to segmentation and positioning of a target object that occupies a small percentage of an image and requires a high resolution, including but not limited to: defect detection of tabs in lithium batteries, recognition and labeling of species observed in the wild, detection and interpretation of human facial micro-expressions, and the like. In a case of observing a species in the wild, recognition of the species is generally based on labeling of specific patterns and stripes on a specific part of its face or body, and an infrared camera for observation in the wild often cannot provide a clear high-resolution image. Therefore, improved segmentation and positioning algorithms in the present application are used to improve segmentation and positioning of specific patterns and stripes, which facilitates recognition and labeling of the species. Similarly, face recognition through image capturing has been widely used. On this basis, interpreting micro-expressions of recognized faces is widely used. However, a slightly raised mouth corner, a slightly frowned brow, and short-term twitches of a facial muscle generally occupy a small percentage of an entire image and are difficult to be recognized. Therefore, the improved segmentation and positioning algorithms of the present application are used to improve recognition and positioning of micro-expressions, which can improve interpretation accuracy of micro-expressions.

Referring to FIG. 1, FIG. 1 is a flowchart of an image processing method according to some embodiments of the present application. The present application provides an image processing method. As shown in FIG. 1, the method includes: In step 105, an enhanced image of a target object of an input image is determined based on a segmentation algorithm, where the enhanced image of the target object includes an image in which each pixel classified as the target object is displayed in an enhanced manner. The method includes: In step 110, a positioning image of the target object is determined by applying an integral image algorithm to the enhanced image of the target object.

In some examples, the enhanced image of the target object includes an image in which each pixel belonging to the target object is displayed in an enhanced manner and each pixel not belonging to the target object is not displayed in an enhanced manner. In some examples, the enhanced image of the target object may include an image in which a pixel belonging to the target object is displayed with enhanced brightness. In some examples, the enhanced image of the target object may be converted into a form of a mask map.

In some examples, the determining a positioning image of the target object by applying an integral image algorithm to the enhanced image of the target object includes: calculating an integral image for the enhanced image of the target object converted into the form of a mask map. An integral image is a method for quickly calculating a sum of rectangular areas in an image. A value of each pixel in the integral image represents a sum of all pixels in an upper left corner of the pixel in the image. Therefore, once an integral image of an image is calculated, a sum of rectangular areas of any sizes in the image can be quickly calculated. In some examples, the positioning image of the target object may be in the form of a mask map and may be determined based on the integral image. For example, a value of each pixel in the positioning image of the target object may depend on whether the value of the pixel in the integral image is 0. If the value is 0, the value of the pixel in the positioning image of the target object is 0. If the value is not 0, the value of the pixel in the positioning image of the target object is 1. 1 indicates that the pixel belongs to the target object, and 0 indicates that the pixel belongs to the image background or a non-target object.

In the technical solution of this embodiment of the present application, whether each pixel in the image belongs to the target object or belongs to the non-target object is classified based on the segmentation algorithm, and on this basis, the target object is positioned in the input image. The segmentation and positioning of the target object are combined and the segmentation algorithm and the integral image algorithm are combined, so that the positioning accuracy of the target object can be improved.

Figure 2:
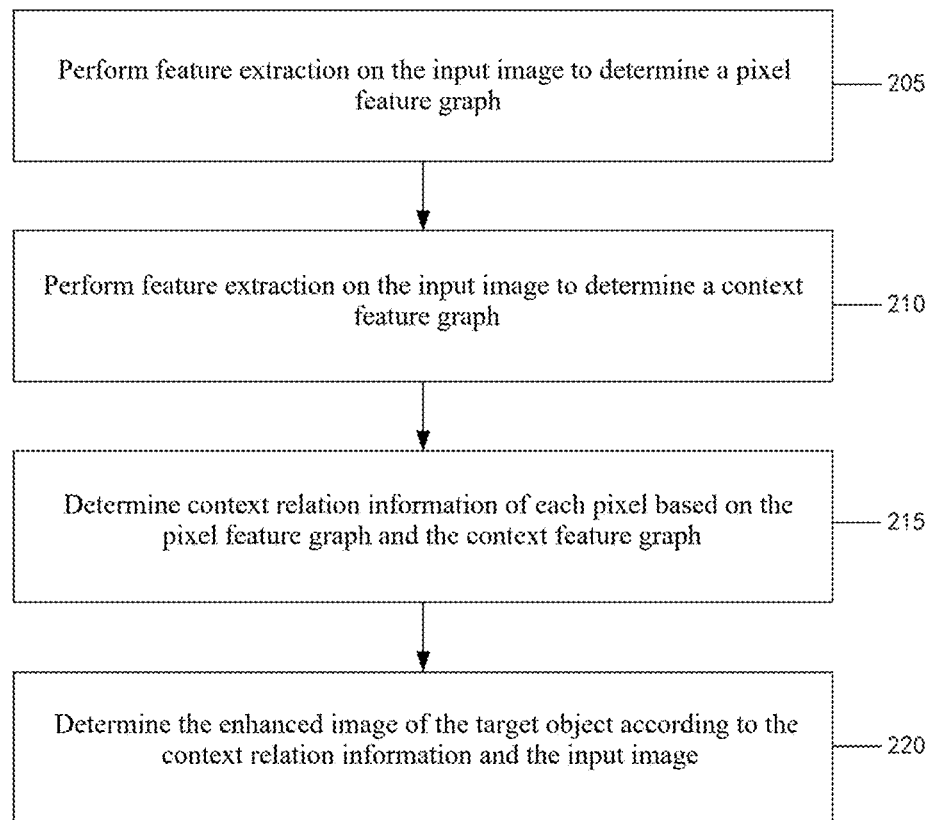
FIG. 2 is a flowchart of a method for determining an enhanced image of a target object of an input image based on a segmentation algorithm according to some embodiments of the present application.
Figure 3:
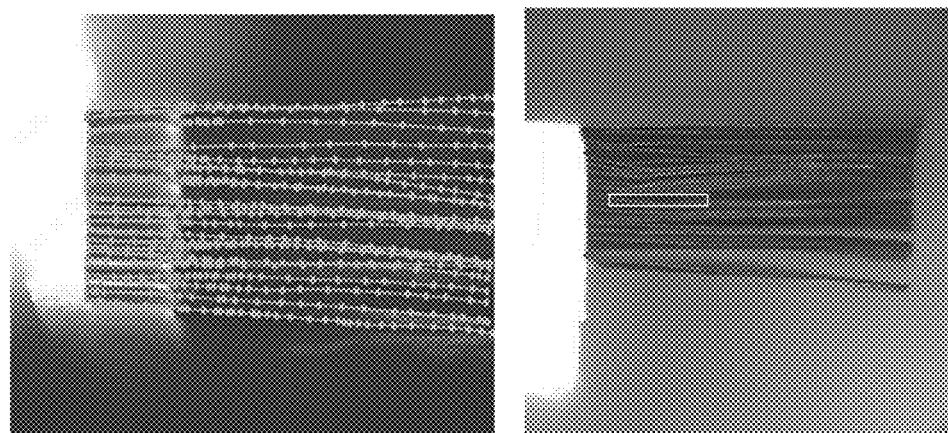
FIG. 3 is an effect diagram of steps of segmenting a target object according to some embodiments of the present application.
Figure 3:
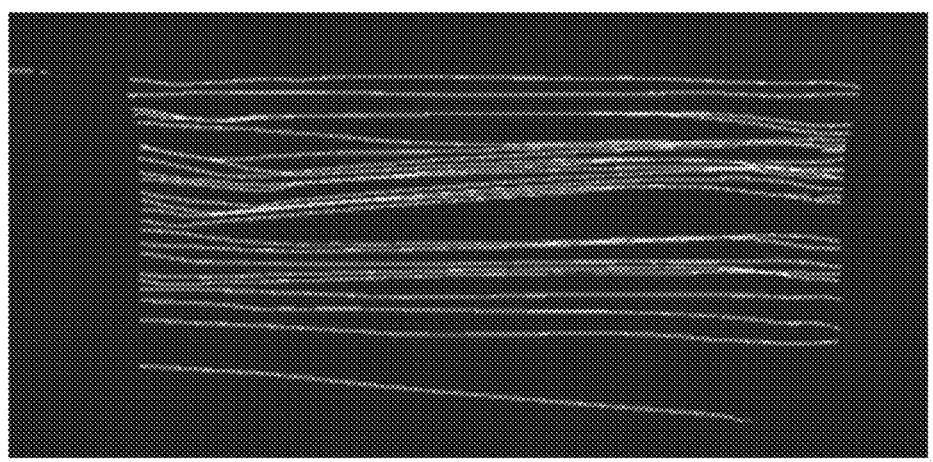

According to some embodiments of the present application, optionally, further referring to FIG. 2 and FIG. 3, FIG. 2 is a flowchart of a method for determining an enhanced image of a target object of an input image based on a segmentation algorithm according to some embodiments of the present application, and FIG. 3 is an effect diagram of steps of segmenting a target object according to some embodiments of the present application. Step 102 in FIG. 1 may further include: step 205: performing feature extraction on the input image to determine a pixel feature graph; step 210: performing feature extraction on the input image to determine a context feature graph; step 215: determining context relation information of each pixel based on the pixel feature graph and the context feature graph; and step 220: determining the enhanced image of the target object according to the context relation information and the input image, where the enhanced image of the target object is generated by changing, based on whether each pixel belongs to the target object or a non-target object, a weight applied to the pixel.

In some examples, step 205 may include: inputting the input image into a deep convolutional neural network to perform pixel-level feature extraction on the input image. In some examples, step 205 may include: inputting the input image into HRNet 18 to generate a feature graph of each pixel in the input image. In some examples, a feature value of each pixel in the pixel feature graph may indicate initial classification of whether the pixel belongs to the target object or a non-target object. In some examples, feature values of pixels range from 0 to 255, and it may be considered that each pixel whose feature value is higher than 128 belongs to the target object and each pixel whose feature value is lower than 128 belongs to a non-target object. In some examples, the pixel feature graph may be a matrix representing pixel-level features (pixel representation) after the input image is calculated by a deep convolutional neural network, and an image representation thereof may be, for example, shown in a in FIG. 3. In some examples, step 210 may include: inputting the input image into a deep convolutional neural network to perform image block-level feature extraction on the input image. In some examples, step 210 may include: inputting the input image into HRNet 18 to generate a feature graph in which the input image includes a pixel block including a center pixel. In some examples, the pixel block may be determined by selecting an appropriate convolution kernel n×n, where n is an odd number. As shown in b in FIG. 3, a block in the figure represents a center pixel, and pixels around the block plus the center pixel represent a pixel block. In some examples, the feature graph of the pixel block may be a matrix representing pixel block-level features (object region representation) after the input image is calculated by a deep convolutional neural network with a selected convolution kernel. In some examples, the feature graph of the pixel block represents feature values extracted in a unit of the pixel block including the center pixel. Similarly, the feature value of the pixel block may indicate whether the pixel block belongs to the target object or a non-target object. In some examples, feature values of pixel blocks range from 0 to 255, and it may be considered that each pixel block whose feature value is higher than 128 belongs to the target object and each pixel block whose feature value is lower than 128 belongs to a non-target object. In some examples, a feature value of a pixel block may represent whether a pixel around the center pixel in the pixel block belongs to the target object or a non-target object or possibility thereof. Herein, the pixel block feature graph and the context feature graph can be used interchangeably to represent information about pixels and/or context around the center pixel in the pixel block. In some examples, step 215 may include: determining context relation information of each pixel based on the pixel feature graph determined in step 205 and the context feature graph determined in step 210, where the context relation information indicates the strength of relation between each pixel and context of the pixel. In some examples, context relation information may be obtained by performing matrix multiplication on the pixel feature graph determined in step 205 and the context feature graph determined in step 210 and applying a softmax function to obtain context relation information of each pixel (pixel region relation). In some examples, when the pixel feature graph of the center pixel indicates that the pixel belongs to the target object (a non-target object), and the context feature graph indicates that the context of the pixel also belongs to the target object (a non-target object), the obtained context relation information of the pixel is strong. When the pixel feature graph and the context feature graph indicate an opposite result (for example, the pixel feature graph indicates that the center pixel belongs to the target object and the context feature graph indicates that a context pixel of the center pixel belongs to a non-target object), the obtained context relation information of the pixel is weak. In some examples, step 220 may include: determining, based on the context relation information in step 215, a final classification of whether each pixel belongs to the target object or a non-target object, and generating the enhanced image of the target object by enhancing, based on the final classification, each pixel belonging to the target object. In some examples, matrix multiplication is performed on the context relation information (pixel region relation) obtained in step 215 and the context feature graph (object region representation) determined in step 210, to obtain a weighted pixel-level feature graph, and the weighted pixel-level feature graph is concatenated with the pixel feature graph (pixel representation) determined in step 205 to obtain a final pixel feature graph. In some examples, the enhanced image of the target object is generated by changing, based on a feature value (which in turn reflects whether the pixel belongs to the target object or a non-target object) of the pixel in the final pixel feature graph, a weight applied to each pixel. An image representation thereof can be shown, for example, in c in FIG. 3. In some examples, the enhanced image of the target object may be generated by increasing a weight applied to each pixel whose feature value is higher than 128.

In the present application, not only pixel-level classification information, but also context classification information around a target pixel are considered in the segmentation algorithm, and a final classification result of the target pixel is determined based on the relation between the target pixel and the context thereof. Context information is incorporated into a segmentation algorithm to further improve the classification accuracy of the target pixel, thereby segmenting the target object more accurately. A weight applied to each pixel finally classified as the target object is changed to generate the enhanced image of the target object, so that the target object is displayed in an enhanced manner, thereby providing a more accurate basis for subsequent positioning processing and further improving the positioning accuracy of the target object. The weight may be configured by a user. A change of weight setting can affect the enhancement effect of the target object in the enhanced image of the target object, so that the desired enhancement effect of the target object can be achieved through user setting.

According to some embodiments of the present application, optionally, the determining a positioning image of the target object by applying an integral image algorithm to the enhanced image of the target object further includes: determining an integral image according to the enhanced image of the target object; and determining the positioning image of the target object by using the integral image.

Figure 4:
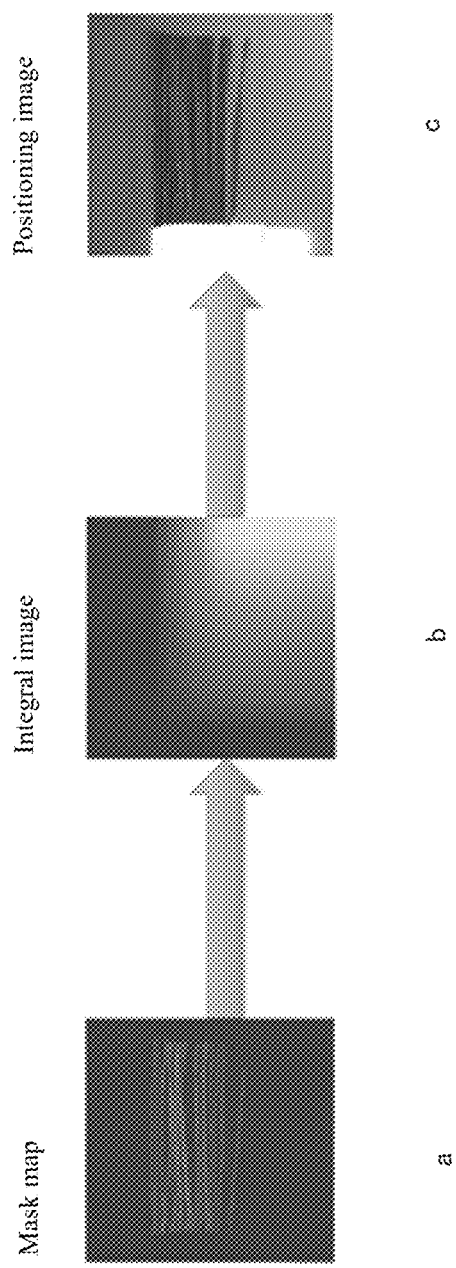
FIG. 4 is an effect diagram of steps of positioning a target object according to some embodiments of the present application.

In some examples, an integral image is calculated for the enhanced image of the target object, as shown in a and b in FIG. 4. In some examples, normalization is performed on the integral image to find a set of parameters based on invariant moments of the image, so that the parameters can cancel the impact of other transformation functions on image transformation:

$$\text{img\_normal} = \text{img\_integral}/\max(\text{img\_integral}(:)).$$

In some examples, an integral image algorithm is used to find an upper left point and a lower right point as follows:

$$x\_\text{left}, y\_\text{left} = \text{img\_normal} > \text{low\_thr}$$

$$x\_\text{right}, y\_\text{right} = \text{img\_normal} > \text{high\_thr}.$$

The integral graph algorithm is applied to the final classification result obtained based on the segmentation algorithm of the present application, so that the target object can be accurately positioned.

The integral image algorithm is applied to the enhanced image of the target object in which the target object is displayed in an enhanced manner, so that the positioning accuracy of the target object can be further improved.

According to some embodiments of the present application, optionally, the determining an integral image according to the enhanced image of the target object further includes: applying a scale factor to the enhanced image of the target object.

In some examples, a scale factor (img_scale) is applied to the enhanced image of the target object converted into the form of a mask map. In some examples, during the calculation of the integral image, a redundant length can be extended to ensure positioning accuracy in the following manner:

$$y\_extend=(int)((y\_right-y\_left)*extend\_scale\_y/2)$$

$$x\_extend=(int)((x\_right-x\_left)*extend\_scale\_x/2).$$

In an example of applying the scale factor, the following formula is used to map back to the original image based on the scale factor (img_scale) to generate the positioning image of the target object, as shown in c in FIG. 3:

$$x\_top=(int)(max((x\_left-x\_extend),0)/img\_scale)$$

$$y\_top=(int)(max((y\text{-}left-y\_extend),0)/img\_scale)$$

$$x\_bottom=(int)(max((x\_left-x\_extend),0)/img\_scale)$$

$$y\_bottom=(int)(max((y\text{-}left-y\_extend),0)/img\_scale).$$

A volume of data to be processed can be adjusted by applying a scale factor, so that an operation process can be accelerated and/or the accuracy of the integral image can be improved according to actual needs.

According to some embodiments of the present application, optionally, the method further includes: calculating a loss rate between the enhanced image of the target object and the input image based on a loss function; and feeding back the calculated loss rate to the segmentation algorithm.

In some examples, a cross entropy loss (cross entropy loss) function may be used to calculate a loss rate between the enhanced image of the target object generated in step 220 and the input image. In some examples, the calculated loss rate represents the similarity between the enhanced image of the target object and the original input image.

A loss rate between the enhanced image of the target object output by the segmentation algorithm and a labeled production line image reflects the similarity between the enhanced image of the target object output by the segmentation algorithm and the original input image. The loss rate is fed back to the segmentation algorithm to perform supervised learning training on the segmentation algorithm. The accuracy of the segmentation algorithm can be improved through continuous training and learning while fit regression is trained.

According to some embodiments of the present application, optionally, the method further includes: updating the segmentation algorithm based on the loss rate or the labeled production line image or a combination of both.

The segmentation algorithm in the present application trains the calculated loss rate or the labeled production line image or a combination of both as training data, and can continuously improve the accuracy of the segmentation algorithm in target object segmentation in a supervised learning manner. In addition, since the training data all comes from the real production line, the training data can cover actual needs and be used and promoted in practice in the production line.

Figure 5:
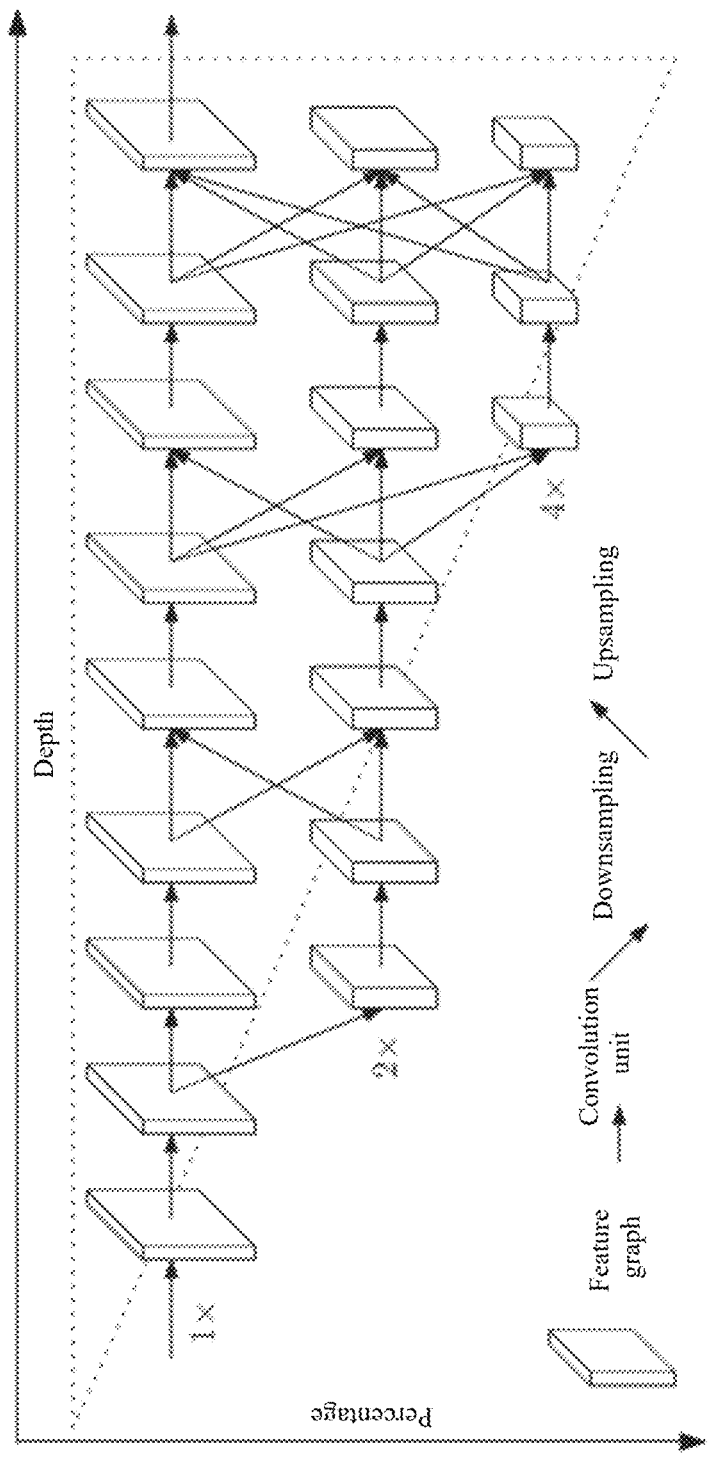
FIG. 5 is an architectural diagram of a network model for implementing a segmentation algorithm of an image processing method according to some embodiments of the present application.

According to some embodiments of the present application, optionally, further referring to FIG. 5, FIG. 5 is an architecture diagram of a network model of a segmentation algorithm for implementing an image processing method according to some embodiments of the present application. The segmentation algorithm is implemented by a deep convolutional neural network HRNet18.

In some examples, HRNet is a high-resolution network that can maintain a high-resolution representation in an entire process. Starting from a high-resolution subnetwork as the first stage, subnetworks from high resolutions to low resolutions are gradually added to form more stages, and multi-resolution subnetworks are connected in parallel. In the entire process, multi-scale repeated fusion is performed by repeatedly exchanging information on parallel multi-resolution subnetworks. Keypoints are estimated based on high-resolution representations output by the network, and a network architecture is shown in FIG. 4. In some examples, in consideration of whether the segmentation of the target object depends on very high-level semantic information and a limited volume of real training data, the smaller model HRNet18 in the HRNet series is selected to implement the segmentation algorithm of the present application.

HRNet18 maintains high-resolution features in the entire segmentation algorithm process and facilitates accurate segmentation of the target object. In addition, different branches of the HRNet18 network produce features of different resolutions, and these features interact to obtain information, so that high-resolution features including multi-channel information can be obtained. In addition, in a case of a limited volume of training data, selection of the HRNet18 model avoids the risk of overfitting and at the same time can accelerate the operation speed of the entire segmentation algorithm because of the small structure of the model.

According to some embodiments of the present application, referring to FIG. 1 to FIG. 5, the present application provides an image processing method, including: performing feature extraction on the input image to determine a pixel feature graph; performing feature extraction on the input image to determine a context feature graph; determining context relation information of each pixel based on the pixel feature graph and the context feature graph; and determining the enhanced image of the tab according to the context relation information and the input image, where the enhanced image of the tab is generated by changing, based on whether each pixel belongs to the tab, a weight applied to the pixel; determining an integral image according to the enhanced image of the tab, where a scale factor is applied to the enhanced image of the tab; and using the integral image to determine the positioning image of the tab, where the segmentation algorithm is implemented by HRNet18.

Figure 6:
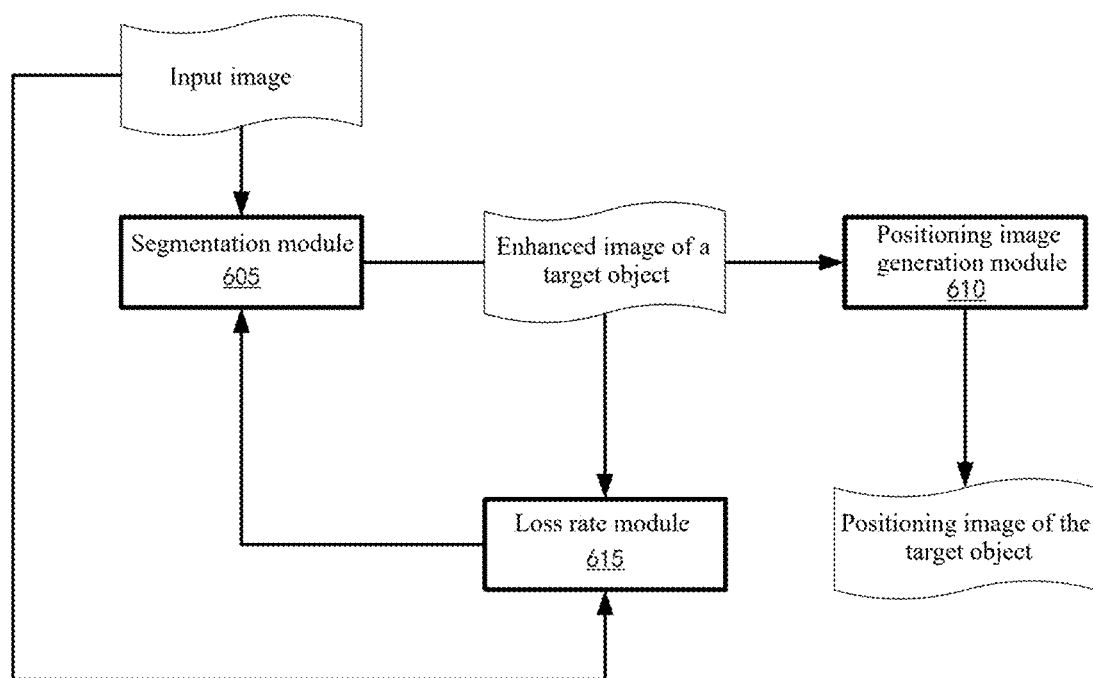
FIG. 6 is a functional block diagram of an image processing system according to some embodiments of the present application.

Referring to FIG. 6, FIG. 6 is a functional block diagram of an image processing system according to some embodiments of the present application. The present application provides an image processing system. As shown in FIG. 6, the system includes: a segmentation module 605, configured to determine an enhanced image of a target object of an input image based on a segmentation algorithm, where the enhanced image of the target object includes an image in which each pixel classified as the target object is displayed in an enhanced manner; and a positioning image generation module 610, configured to determine a positioning image of the target object by applying an integral image algorithm to the enhanced image of the target object.

In the technical solution of this embodiment of the present application, whether each pixel in the image belongs to the target object or belongs to the non-target object is classified based on the segmentation algorithm, and on this basis, the target object is positioned in the input image. The segmentation and positioning of the target object are combined and the segmentation algorithm and the integral image algorithm are combined, so that the positioning accuracy of the target object can be improved.

Figure 7:
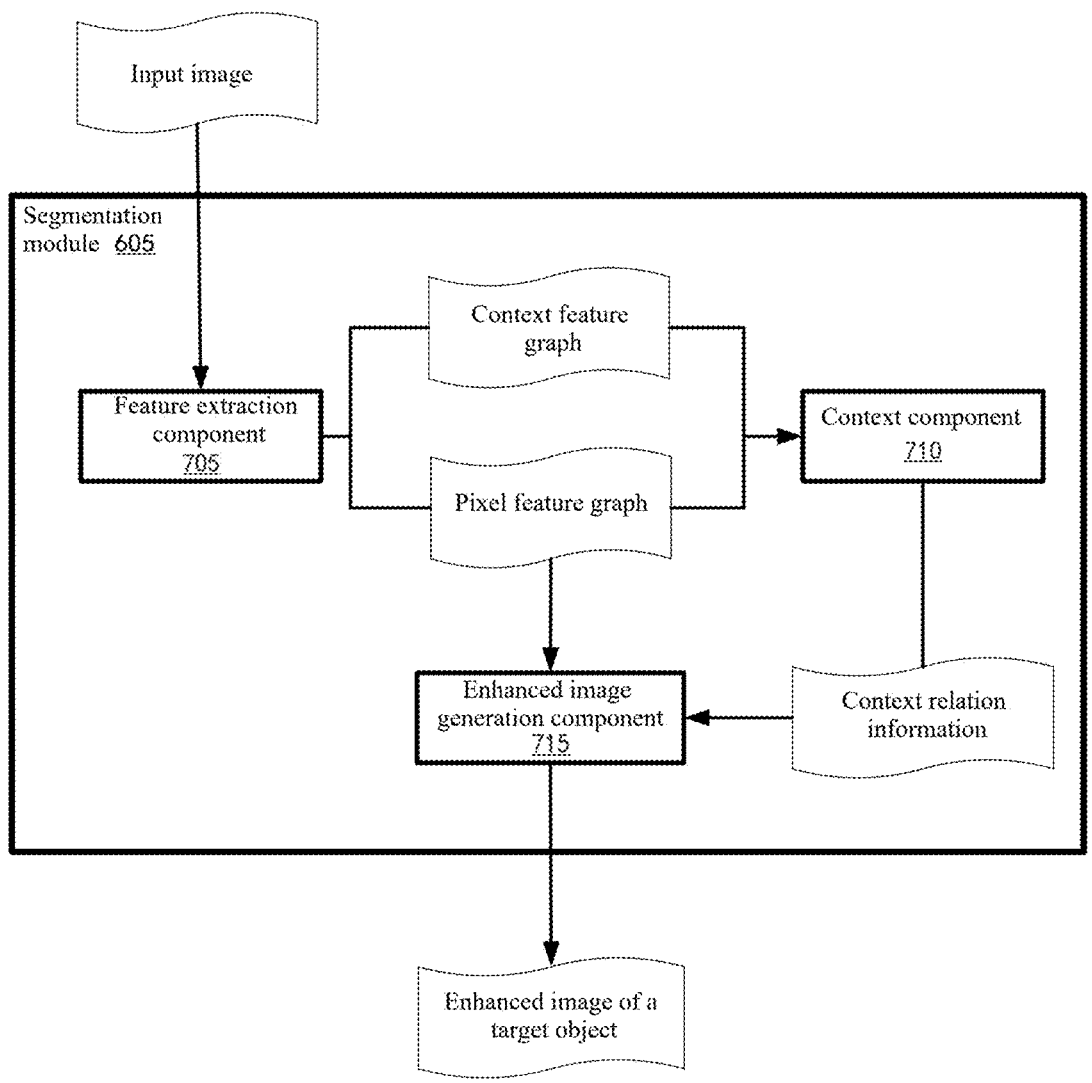
FIG. 7 is a functional block diagram of a segmentation module according to some embodiments of the present application.

According to some embodiments of the present application, optionally, further referring to FIG. 7, FIG. 7 is a functional block diagram of the segmentation module according to some embodiments of the present application.

The segmentation module 605 further includes: a feature extraction component 705, configured to perform feature extraction on the input image to determine a pixel feature graph and perform feature extraction on the input image to determine a context feature graph; a context component 710, configured to determine context relation information of each pixel based on the pixel feature graph and the context feature graph; and an enhanced image generation component 715, configured to determine the enhanced image of the target object according to the context relation information and the input image, where the enhanced image of the target object is generated by changing, based on whether each pixel belongs to the target object or a non-target object, a weight applied to the pixel.

In the present application, not only pixel-level classification information, but also context classification information around a target pixel are considered in the segmentation algorithm, and a final classification result of the target pixel is determined based on the relation between the target pixel and the context thereof. Context information is incorporated into a segmentation algorithm to further improve the classification accuracy of the target pixel, thereby segmenting the target object more accurately. A weight applied to each pixel finally classified as the target object is changed to generate the enhanced image of the target object, so that the target object is displayed in an enhanced manner, thereby providing a more accurate basis for subsequent positioning processing and further improving the positioning accuracy of the target object. The weight may be configured by a user. A change of weight setting can affect the enhancement effect of the target object in the enhanced image of the target object, so that the desired enhancement effect of the target object can be achieved through user setting.

According to some embodiments of the present application, optionally, still referring to FIG. 6, the positioning image generation module 610 is further configured to: determine an integral image according to the enhanced image of the target object; and determine the positioning image of the target object by using the integral image.

The integral image algorithm is applied to the enhanced image of the target object in which the target object is displayed in an enhanced manner, so that the positioning accuracy of the target object can be further improved.

According to some embodiments of the present application, optionally, still referring to FIG. 6, the positioning image generation module 610 is further configured to apply a scale factor to the enhanced image of the target object.

A volume of data to be processed can be adjusted by applying a scale factor, so that an operation process can be accelerated and/or the accuracy of the integral image can be improved according to actual needs.

According to some embodiments of the present application, optionally, still referring to FIG. 6, the system further includes a loss rate module 615, configured to: calculate a loss rate between the enhanced image of the target object and the input image based on a loss function; and feed back the calculated loss rate to the segmentation algorithm to update the segmentation module.

A loss rate between the enhanced image of the target object output by the segmentation algorithm and a labeled production line image reflects the similarity between the enhanced image of the target object output by the segmentation algorithm and the original input image. The loss rate is fed back to the segmentation algorithm to perform supervised learning training on the segmentation algorithm. The accuracy of the segmentation algorithm can be improved through continuous training and learning while fit regression is trained.

According to some embodiments of the present application, optionally, still referring to FIG. 6, the segmentation module 605 is further configured to update the segmentation module based on the loss rate or the labeled production line image or a combination of both.

The segmentation algorithm in the present application trains the calculated loss rate or the labeled production line image or a combination of both as training data, and can continuously improve the accuracy of the segmentation algorithm in target object segmentation in a supervised learning manner. In addition, since the training data all comes from the real production line, the training data can cover actual needs and be used and promoted in practice in the production line.

According to some embodiments of the present application, referring to FIG. 6 and FIG. 7, the present application provides an image processing system, including:

a segmentation module 605, including:
  a feature extraction component 705, configured to perform feature extraction on the input image to determine a pixel feature graph and perform feature extraction on the input image to determine a context feature graph;
  a context component 710, configured to determine context relation information of each pixel based on the pixel feature graph and the context feature graph; and
  an enhanced image generation component 715, configured to determine the enhanced image of the tab according to the context relation information and the input image, where the enhanced image of the tab is generated by changing, based on whether each pixel belongs to the tab, a weight applied to the pixel; and
a positioning image generation module 610, configured to: determine an integral image according to the enhanced image of the tab; and use the integral image to determine a positioning image of the tab, where a scale factor is applied to the enhanced image of the tab.

Figure 8:
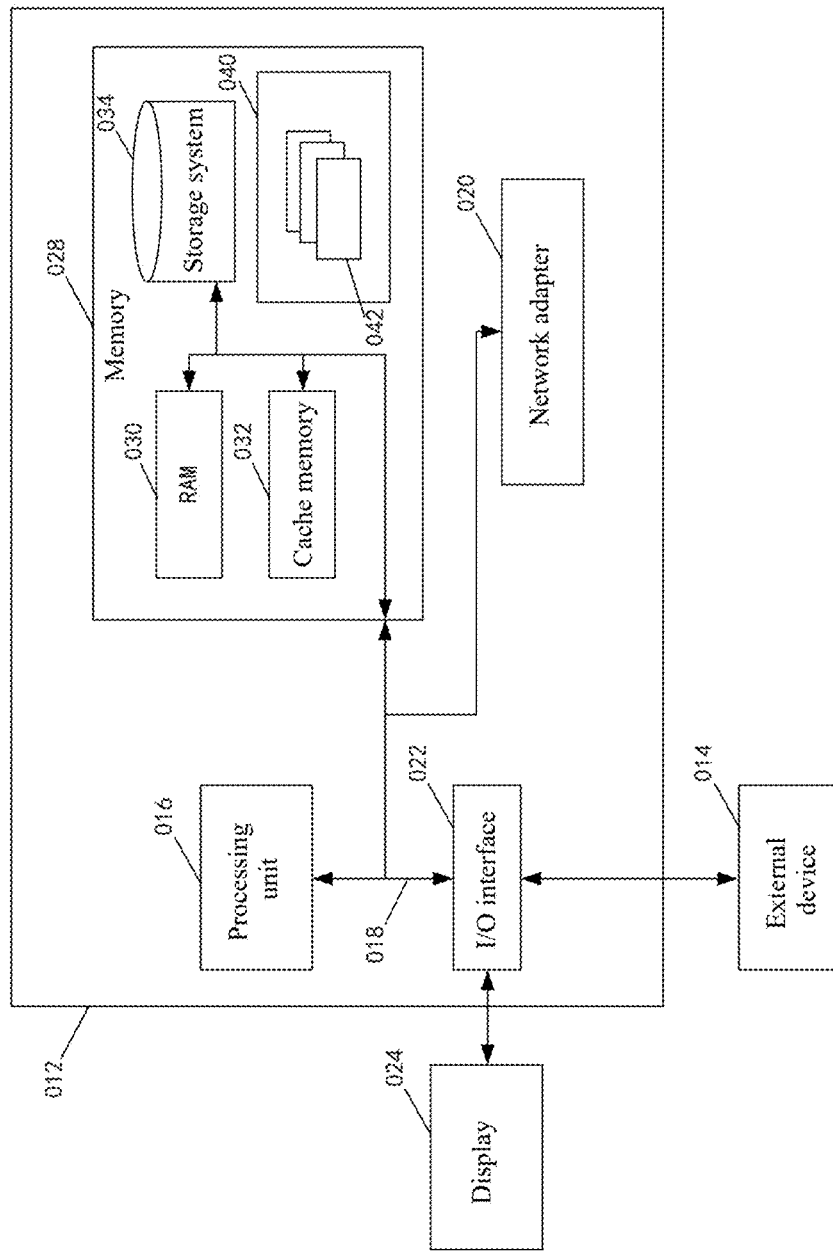
FIG. 8 is a structural block diagram of a computer system suitable for implementing an image processing system according to some embodiments of the present application.

Referring to FIG. 8, FIG. 8 is a structural block diagram of a computer system suitable for implementing an image processing system according to some embodiments of the present application. As shown in FIG. 8, the system includes: a memory 028 storing computer-executable instructions; and a processor 016 coupled to the memory 028, where the computer-executable instructions, when executed by the processor, cause the system to perform the following operations: determining an enhanced image of a target object of an input image based on a segmentation algorithm, where the enhanced image of the target object includes an image in which each pixel classified as the target object is displayed in an enhanced manner; and determining a positioning image of the target object by applying an integral image algorithm to the enhanced image of the target object.

In some examples, FIG. 8 is a structural block diagram of a computer system 012 suitable for implementing an image processing system according to some embodiments of the present application. The computer system 012 shown in FIG. 8 is only an example, and should not limit the function and application scope of this embodiment of the present application.

As shown in FIG. 8, the computer system 012 is represented in a form of a general-purpose computing device. Components of the computer system 012 may include, but are not limited to: one or more processors or processing units 016, a system memory 028, and a bus 018 connecting different system components (including the system memory 028 and the processing unit 016).

The bus 018 represents one or more of several types of bus structures, including a memory bus or a memory controller, a peripheral bus, an accelerated graphics port, a processor, or a local bus using any one of multiple bus structures. Examples of these structures include, but are not limited to, an industry standard architecture (ISA) bus, a micro channel architecture (MCA) bus, an enhanced ISA bus, a video electronics standards association (VESA) local bus, and a peripheral component interconnect (PCI) bus.

The computer system 012 typically includes multiple computer system readable mediums. These mediums can be any available medium that can be accessed by the computer system 012 and include both volatile and nonvolatile mediums, and removable and non-removable mediums.

The system memory 028 may include a computer system readable medium in a form of a volatile memory, such as a random access memory (RAM) 030 and/or a cache memory 032. The computer system 012 may further include other removable/non-removable and volatile/nonvolatile computer system storage mediums. By way of example only, the storage system 034 may be configured to read from and write into non-removable and non-volatile magnetic mediums (not shown in FIG. 6, commonly referred to as a "hard disk drive"). Although not shown in FIG. 6, hard disk drives for reading from and writing into removable non-volatile disks (for example, "floppy disks") and optical disc drives for reading from and writing into removable non-volatile optical discs (for example, CD-ROMs, DVD-ROMs, or other optical mediums) may be provided. In these cases, each drive may be connected to the bus 018 through one or more data medium interfaces. The memory 028 may include at least one program product having a set (for example, at least one) of program modules configured to perform the functions of the embodiments of the present application.

A program/utility 040 having a set (at least one) of program modules 042 may be stored, for example, in the memory 028. Such program module 042 includes but is not limited to an operating system, one or more application programs, and other program modules and program data. Each or some combination of these examples may include the implementation of a network environment. The program module 042 generally performs the functions and/or methods of the described embodiments of the present application.

The computer system 012 can also communicate with one or more external devices 014 (for example, a keyboard, a pointing device, and a display 024). In the present application, the computer system 012 communicates with external radar devices, and can further communicate with one or more devices that enable a user to interact with the computer system 012, and/or any device (for example, a network card and a modem) that enables the computer system 012 to communicate with one or more other computing devices. Such communication may occur through an input/output (I/O) interface 022. Moreover, the computer system 012 can further communicate with one or more networks (for example, a local area network (LAN), a wide area network (WAN), and/or a public network such as the Internet) through a network adapter 020. As shown in the figure, the network adapter 020 communicates with other modules of the computer system 012 through the bus 018. It should be understood that although not shown in FIG. 7, other hardware and/or software modules may be used in conjunction with the computer system 012, including but not limited to: microcode, device drives, redundant processing units, external disk drive arrays, RAID systems, tape drives, data backup storage systems, and the like.

The processing unit 016 executes various functional applications and data processing by running the programs stored in the system memory 028, such as implementing the method flow provided by the embodiments of the present application.

The computer program can be provided in a computer storage medium, that is, the computer storage medium is encoded with the computer program, and when the program is executed by one or more computers, the one or more computers can be enabled to execute the method flow and/or the apparatus operation provided by the embodiments of the present application. For example, the method flow provided by the embodiments of the present application is executed by the one or more processors.

As time progresses and technologies advance, the meaning of mediums has become more and more extensive, and the transmission path of computer programs is no longer limited to tangible mediums, and can also be downloaded directly from the Internet. Any combination of one or more computer readable mediums may be used.

The computer readable medium may be a computer readable signal medium or a computer readable storage medium. A computer readable storage medium may be, for example, but is not limited to, electrical, magnetic, optical, electromagnetic, infrared, or semiconductor systems, apparatuses, or devices, or any combination thereof. More specific examples (a non-exhaustive list) of the computer readable storage medium include: an electrical connection with one or more conductors, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof. In this document, a computer readable storage medium may be any tangible medium that contains or stores a program that can be used by or in conjunction with an instruction execution system, apparatus, or device.

A computer readable signal medium may include a data signal transmitted in a baseband or as a part of a carrier wave, and carries computer readable program code. Such propagated data signal may be in many forms, including but not limited to an electromagnetic signal, an optical signal, or any suitable combination thereof. A computer readable signal medium may also be any computer readable medium other than a computer readable storage medium, and the computer readable medium can send, propagate, or transmit a program used by or in conjunction with an instruction execution system, apparatus, or device.

Program code contained on a computer readable medium may be transmitted through any appropriate medium, including but not limited to a wireless manner, a wireline, an optical cable, RF, or any suitable combination thereof.

Computer program code for performing the operations of the present application may be written in one or more programming languages or a combination thereof. The programming languages include object-oriented programming languages such as Java, Smalltalk, and C++, and conventional procedural programming languages such as the "C" language, or a similar programming language. The program code may run entirely on a user computer, run partly on a user computer, run as a standalone software package, run partly on a user computer and partly on a remote computer, or run entirely on a remote computer or server. In a case of a remote computer, the remote computer can be connected to a user computer through any network including a local area network (LAN) or a wide area network (WAN), or can be connected to an external computer (for example, connected through the Internet provided by an Internet service provider).

Finally, it should be noted that the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. An image processing method, comprising:
    determining whether each pixel of an input image belongs to a target object of the input image using a segmentation algorithm, wherein the target object is composed of pixels belonging to the target object;
    determining an enhanced image of the target object, wherein the enhanced image of the target object is an image in which each pixel of the target object is displayed in an enhanced manner; and
    determining a positioning image of the target object by applying an integral image algorithm to the enhanced image of the target object;
  wherein determining whether each pixel of the input image belongs to the target object of the input image using the segmentation algorithm comprises:
    inputting the input image into a deep convolutional neural network to perform a pixel-level feature extraction on the input image; and
    determining whether the pixel belongs to the target object based on a feature value of the pixel;
  wherein determining the enhanced image of the target object comprises:
    performing a feature extraction on the input image to determine a pixel feature graph;
    performing a feature extraction on the input image to determine a context feature graph;
    determining context relation information of each pixel based on the pixel feature graph and the context feature graph; and
    determining the enhanced image of the target object according to the context relation information of each pixel of the input image;
  wherein each pixel of the input image carries weight information, and determining the enhanced image of the target object according to the context relation information of each pixel of the input image comprises:
    changing weight information of the pixels belonging to the target object, so that the target object is displayed in the enhanced manner.

2. The method according to claim 1, wherein determining the positioning image of the target object by applying the integral image algorithm to the enhanced image of the target object comprises:
    determining an integral image according to the enhanced image of the target object; and
    determining the positioning image of the target object by using the integral image.

3. The method according to claim 2, wherein determining the integral image according to the enhanced image of the target object comprises:
    applying a scale factor to the enhanced image of the target object.

4. The method according to claim 1, wherein the method further comprises:
    calculating a loss rate between the enhanced image of the target object and the input image based on a loss function; and
    feeding back the calculated loss rate to the segmentation algorithm to update the segmentation algorithm.

5. The method according to claim 1, wherein the segmentation algorithm is implemented by a deep convolutional neural network HRNet18.

6. An image processing system, comprising:
    a memory storing computer-executable instructions; and
    a processor coupled to the memory,
  wherein the computer-executable instructions, when executed by the processor, cause the system to perform the following operations:
    determining whether each pixel of an input image belongs to a target object of the input image using a segmentation algorithm, wherein the target object is composed of pixels belonging to the target object;
    determining an enhanced image of the target object, wherein the enhanced image of the target object is an image in which each pixel of the target object is displayed in an enhanced manner; and
    determining a positioning image of the target object by applying an integral image algorithm to the enhanced image of the target object;
  wherein determining whether each pixel of the input image belongs to the target object of the input image using the segmentation algorithm comprises:
    inputting the input image into a deep convolutional neural network to perform a pixel-level feature extraction on the input image; and
    determining whether the pixel belongs to the target object based on a feature value of the pixel;
  wherein determining the enhanced image of the target object comprises:
    performing a feature extraction on the input image to determine a pixel feature graph;
    performing a feature extraction on the input image to determine a context feature graph;
    determining context relation information of each pixel based on the pixel feature graph and the context feature graph; and
    determining the enhanced image of the target object according to the context relation information of each pixel of the input image;
  wherein each pixel of the input image carries weight information, and determining the enhanced image of the target object according to the context relation information of each pixel of the input image comprises:
    changing weight information of the pixels belonging to the target object, so that the target object is displayed in the enhanced manner.

7. The system according to claim 6, wherein determining the positioning image of the target object by applying the integral image algorithm to the enhanced image of the target object comprises:
   determining an integral image according to the enhanced image of the target object; and
   determining the positioning image of the target object by using the integral image.

8. The system according to claim 7, wherein determining the integral image according to the enhanced image of the target object comprises:
   applying a scale factor to the enhanced image of the target object.

9. The system according to claim 6, wherein the computer-executable instructions, when executed by the processor, further cause the system to perform the following operations:
   calculating a loss rate between the enhanced image of the target object and the input image based on a loss function; and
   feeding back the calculated loss rate to the segmentation algorithm to update the segmentation algorithm.

10. The system according to claim 6, wherein the segmentation algorithm is implemented by a deep convolutional neural network HRNet18.

\* \* \* \* \*